UNITED STATES PATENT OFFICE.

ALBERT D. CHASE, OF SEA CLIFF, NEW YORK.

IMPROVEMENT IN METHODS OF MAKING JELLY FROM DRIED FRUIT.

Specification forming part of Letters Patent No. 154,839, dated September 8, 1874; application filed July 18, 1874.

*To all whom it may concern:*

Be it known that I, ALBERT D. CHASE, of Sea Cliff, Queens county, in the State of New York, have invented a new and Improved Method of Making Jelly from Dried Fruit, of which the following is a specification:

The object of my invention is twofold: first, to shorten and cheapen the process of extracting from dried fruit its jellifiable juices; and, second, the production of jelly of a color and flavor and consistency superior to that made by any of the methods now in use, to my knowledge, and I secure these results by the method hereinafter described. My process relates to the making of jelly from dried fruit, it having been ascertained that jelly from dried fruit can be made that is more solid, will endure transportation and change of climate better, and possessing a more desirable fruit flavor than by any method it can be made from fresh fruit, as gathered from the tree or vine.

I will proceed to describe my new method: I take a quantity of dried fruit from which I desire to extract the juice for jelly, and put it into a suitable vessel, one having a perforated false bottom, raised somewhat from the true bottom, and one to which heat may be applied, preferably steam heat, by a steam coil or pipe within the vessel, or into a steam-jacket around the vessel, and add water, the quantity to be determined by the gravity of the juice. I desire, usually, about double the quantity which the fruit will absorb. I then apply heat and raise the temperature of the mass to about 100° Fahrenheit, and, holding it at this temperature, let it stand for about one hour, or until the fruit shall have absorbed all the water that it will. I then raise the temperature to about 200°, according to the solidity of the fruit, at which temperature I let it stand about one hour more. Then I commence drawing off the liquor at the bottom and pouring it back upon the top of the fruit, and continue this operation of repeated leaching until the desired quantity of the liquor is obtained, or until the jellifiable elements in the fruit are either extracted or have become completely dissolved, so that by pressure they may be separated from the pulp of the fruit. I then draw off the liquor and press the pulp to obtain the whole amount. I then take one-half of this liquor thus obtained and add to it about double the amount of sugar that would be required or desirable in the jelly if it were intended to use this half of the liquor alone in making the jelly, and evaporate it down, over a moderate heat, to about a jelly gravity. Then, to this concentrated juice, either immediately or at any time after it has become jellied or cooled, I add the other half of this liquor, or as much of it as will impart to the jelly the desirable tartness, and then evaporate the whole to the gravity required for jelly.

I have found that by pursuing the peculiar method hereinbefore described of extracting the juice of dried fruit—namely, first submitting the fruit to the solvent action of moderately warm water for a suitable time; second, increasing the heat to near the boiling-point, and letting it stand at that temperature for about an equal time; and, third, running the liquor through the fruit by repeated leachings, as described—the jellifiable elements of the fruit are more completely dissolved and extracted, and a juice obtained that has in a higher degree the peculiar natural flavor of the fruit than is possible by any of the methods hitherto practiced.

After the juices of the fruit are extracted, my method of conducting their evaporation, as is evident from the foregoing description, is peculiar in the following particulars: I commence the evaporating process with juice of a high gravity, due to the large amount of sugar dissolved in it. Under these conditions of the juice it is not requisite to remove so much of the water by evaporation in order to reduce the juice to jelly as it would be if it contained less sugar, it being the fact that the larger the quantity of sugar dissolved in the juice the less evaporation is required to jellify it, the sugar seeming to assist in holding and binding in the compound a portion of water which would, but for it, have to be removed. When jelly has been thus formed containing more sugar than is desirable for the requisite agreeable tartness of the jelly, I add sufficient of unevaporated sourer juice to impart that requisite tartness, and then the removal of a small part of its water reduces the mass to a condition to form a jelly of a firmer consistency, of a finer fruit flavor, and of a better quality in all respects, than that made by any other process within my knowledge. By this method, (I should add,) as there is less of the water of the juice evaporated to form jelly of the consistency named than when the requisite sugar is dissolved in the entire mass of the juice, and then the juice is evaporated by a single operation, a greater quantity of jelly is produced from a given amount of fruit, and less time and fuel are consumed in the evaporation. Therefore, both for economical reasons and because of a superior result, my new method of extracting the juice from dried fruit, and converting that juice into jelly, is superior to that in common use.

I do not here claim, broadly, the making of jelly from dried fruit, though I believe I am the first to have done so, reserving such claim for a separate and independent application for a patent, which it is my purpose to make.

What I claim as my invention, and desire to secure by Letters Patent, is—

1. The process of extracting the jellifiable juices of dried fruit by first subjecting the fruit to the solvent action of moderately warm water; then, second, raising the temperature of said water to near the boiling-point, and subjecting the fruit to the action of said hot water until the jellifiable elements in the fruit are dissolved; then, third, repeatedly leaching the said water through the fruit, in the manner described, until the jellifiable elements of the fruit are extracted, all substantially as described.

2. In continuation of the extracting process described, the method of making jelly by first evaporating to a jelly consistency a portion of the crude juice, containing about double the sugar required for such juice; and, second, adding thereto about an equal portion of crude unsweetened juice; and, third, evaporating the resulting liquor to a jelly consistency, all substantially as described.

Witness my hand this 16th day of July, 1874.

ALBERT D. CHASE.

Witnesses:
 J. P. FITCH,
 B. S CLARK.